US012757816B2

(12) United States Patent
Ryder et al.

(10) Patent No.: US 12,757,816 B2
(45) Date of Patent: Oct. 13, 2026

(54) ROW UNIT FOR AN AGRICULTURAL SEEDING IMPLEMENT

(71) Applicant: CNH Industrial Canada, Ltd., Saskatoon (CA)

(72) Inventors: Nicholas George Alfred Ryder, Saskatoon (CA); Ka Po Catherine Hui, Saskatoon (CA); Cory A. Yuen, Saskatoon (CA); Ryan Roy Britton, Saskatoon (CA); Nathan Corey Hauser, Saskatoon (CA); Nathan J. Churko, Martensville (CA); Brendan Deibert, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 326 days.

(21) Appl. No.: 18/392,240

(22) Filed: Dec. 21, 2023

(65) Prior Publication Data

US 2025/0204303 A1 Jun. 26, 2025

(51) Int. Cl.
*A01C 7/20* (2006.01)

(52) U.S. Cl.
CPC .............. *A01C 7/203* (2013.01); *A01C 7/208* (2013.01)

(58) Field of Classification Search
CPC .......... A01C 7/201; A01C 7/203; A01C 7/208
USPC ... 111/79, 80, 149, 152–154, 156, 157, 170, 111/186, 187
See application file for complete search history.

(56) References Cited

U.S. PATENT DOCUMENTS

| | | | | | |
|---|---|---|---|---|---|
| 718,620 | A * | 1/1903 | Griffin | A01C 7/08 | 111/63 |
| 970,186 | A * | 9/1910 | Copeland | A01C 5/06 | 111/80 |
| 1,041,275 | A * | 10/1912 | Harris | A01C 5/06 | 111/164 |
| 1,282,124 | A * | 10/1918 | Phillips | A01C 5/06 | 111/183 |
| 1,823,244 | A * | 9/1931 | White | A01C 5/06 | 111/152 |
| 2,297,384 | A * | 9/1942 | Benjamin | A01C 7/06 | 111/164 |
| 2,318,205 | A * | 5/1943 | Drennan | A01C 7/201 | 111/62 |
| 2,582,503 | A * | 1/1952 | Oehler | A01C 5/066 | 172/686 |

(Continued)

OTHER PUBLICATIONS

Concord Air Seeders Precision Shank Drill, Jul. 2019, 2 pgs.

*Primary Examiner* — Tara Mayo
(74) *Attorney, Agent, or Firm* — Fletcher Yoder, P.C.

(57) ABSTRACT

A row unit for an agricultural seeding implement includes a linkage assembly having a head bracket configured to couple the row unit to a toolbar. The linkage assembly also includes a body, a top link pivotally coupled to the head bracket and to the body, and a bottom link pivotally coupled to the head bracket and to the body. Furthermore, the row unit includes a first opener assembly pivotally coupled to one of the top link or the bottom link via a pivot joint positioned forward of the body with respect to a direction of travel of the row unit. The row unit also includes a pivot control assembly configured to control rotation of the first opener assembly about the pivot joint. In addition, the row unit includes a second opener assembly coupled to the body, and a packer wheel assembly movably coupled to the body.

20 Claims, 4 Drawing Sheets

(56) References Cited

U.S. PATENT DOCUMENTS

| | | | | |
|---|---|---|---|---|
| 3,348,505 | A * | 10/1967 | Smith | A01C 7/06 111/194 |
| 7,690,440 | B2 | 4/2010 | Dean et al. | |
| 7,866,410 | B2 | 1/2011 | Ryder et al. | |
| 2009/0158981 | A1* | 6/2009 | Jagow et al. | A01C 7/203 111/163 |

* cited by examiner

ROW UNIT FOR AN AGRICULTURAL SEEDING IMPLEMENT

BACKGROUND

The present disclosure relates to a row unit for an agricultural seeding implement.

Generally, seeding implements (e.g., seeders) are towed behind a tractor or other work vehicle. Seeding implements typically include multiple row units distributed across a width of the implement. In certain seeding implements, each row unit is configured to deposit seeds at a target depth beneath the soil surface of a field, thereby establishing rows of planted seeds. In addition, each row unit is configured to deposit fertilizer at a target depth beneath the soil surface, thereby establishing rows of fertilizer. For example, each row unit may include a seed opener that forms a seed trench for seed deposition into the soil. A seed tube (e.g., positioned adjacent to the seed opener) is configured to deposit seeds into the seed trench. In addition, each row unit may include a fertilizer opener that forms a fertilizer trench for fertilizer deposition into the soil. A fertilizer tube (e.g., positioned adjacent to the fertilizer opener) is configured to deposit fertilizer into the fertilizer trench. The fertilizer deposited into the fertilizer trench may flow through the soil to seeds deposited in the seed trench, thereby fertilizing the seeds. The openers and tubes may be followed by a packer wheel that packs the soil on top of the deposited seeds and fertilizer.

BRIEF DESCRIPTION

In certain embodiments, a row unit for an agricultural seeding implement includes a linkage assembly having a head bracket configured to couple the row unit to a toolbar. The linkage assembly also includes a body, a top link pivotally coupled to the head bracket and to the body, and a bottom link pivotally coupled to the head bracket and to the body. Furthermore, the row unit includes a first opener assembly pivotally coupled to one of the top link or the bottom link via a pivot joint positioned forward of the body with respect to a direction of travel of the row unit. The row unit also includes a pivot control assembly configured to control rotation of the first opener assembly about the pivot joint. In addition, the row unit includes a second opener assembly coupled to the body, and a packer wheel assembly movably coupled to the body. The packer wheel assembly is configured to control a first penetration depth of the first opener assembly and a second penetration depth of the second opener assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
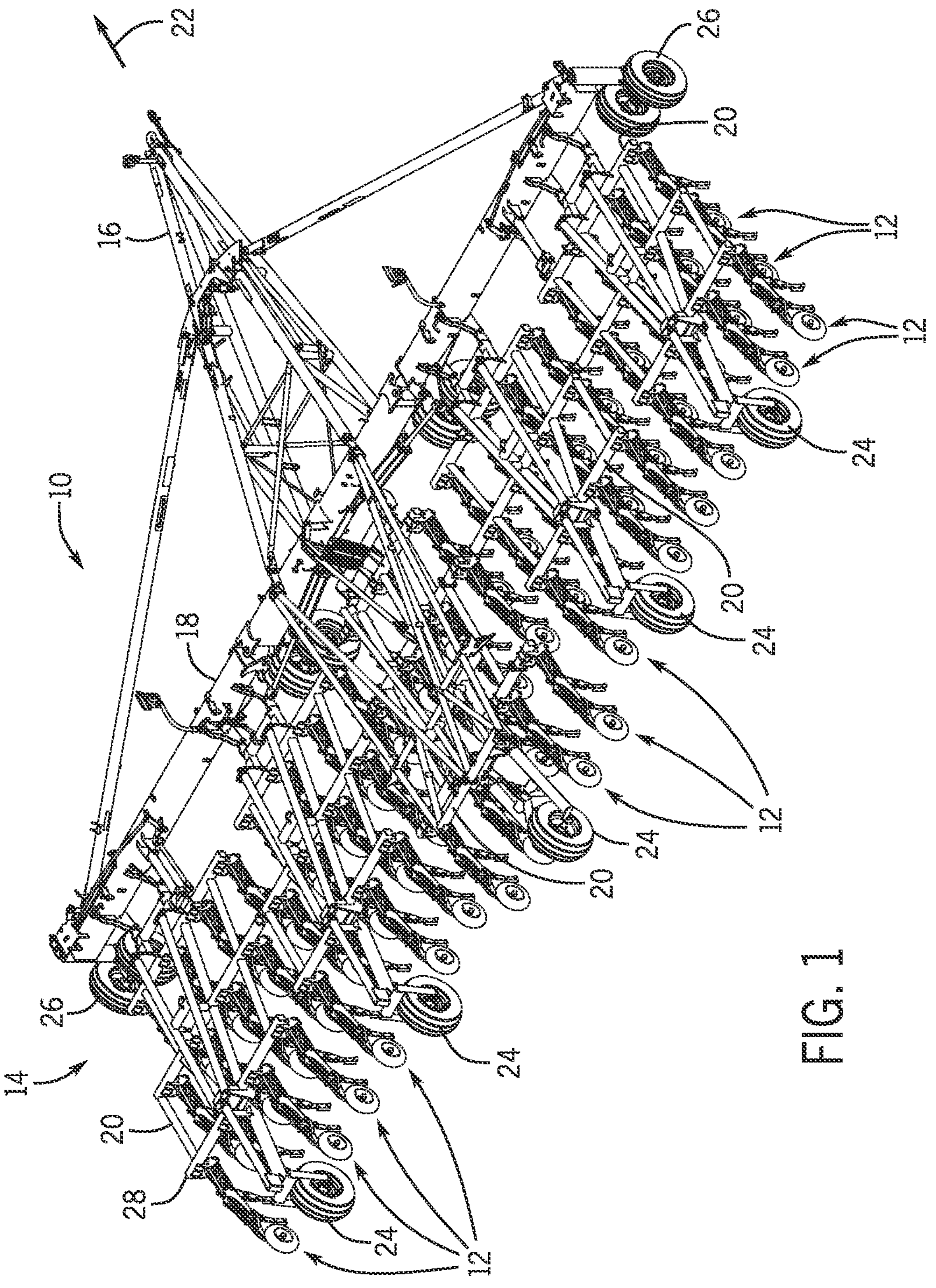
FIG. 1 is a perspective view of an embodiment of an agricultural seeding implement having multiple row units.

FIG. 1 is a perspective view of an embodiment of an agricultural seeding implement 10 (e.g., seeder) having multiple row units 12. In the illustrated embodiment, the agricultural seeding implement 10 includes a frame 14 having a hitch assembly 16, a main support bar 18, and tool frames 20. The hitch assembly 16 is configured to couple to a hitch of a work vehicle (e.g., a tractor) to enable the work vehicle to move the agricultural seeding implement 10 along a direction of travel 22. The hitch assembly 16 is coupled to the main support bar 18, and the main support bar 18 is coupled to the tool frames 20. As illustrated, each tool frame 20 is supported by a respective wheel 24, and the main support bar 18 is supported by multiple wheels 26. In certain embodiments, each tool frame is pivotally coupled to the main support bar to enable the tool frame to follow contours of the soil surface. However, in other embodiments, each tool frame is rigidly (e.g., non-rotatably) coupled to the main support bar (e.g., such that each tool frame and a respective portion of the main support bar form a unitary structure).

In the illustrated embodiment, each row unit 12 is coupled to a toolbar 28 of a respective tool frame 20 and configured to deposit agricultural product within the soil. In certain embodiments, the row units 12 are laterally offset (e.g., offset in a direction perpendicular to the direction of travel 22) from one another, such that adjacent rows of agricultural product are established within the soil. While the agricultural seeding implement frame 14 includes the main support bar 18 and the tool frames 20 in the illustrated embodiment, in other embodiments, the frame may include other and/or additional elements to support the row units. For example, in certain embodiments, the main support bar may be omitted, a center tool frame may be coupled to the hitch assembly, and wing tool frames may be coupled to the center tool frame. Furthermore, in certain embodiments, the tool frames may be omitted, and the row units may be directly coupled to the main support bar (e.g., toolbar), thereby forming a single row of row units.

In certain embodiments, at least one row unit 12 of the agricultural seeding implement 10 (e.g., each row unit 12 of the agricultural seeding implement 10) includes a linkage assembly having a head bracket, a body, a top link, and a bottom link. The head bracket is configured to couple the row unit 12 to a respective toolbar 28, the top link is pivotally coupled to the head bracket and to the body, and the bottom link is pivotally coupled to the head bracket and to the body. Accordingly, the linkage assembly facilitates vertical movement of the body with respect to the toolbar 28.

In addition, the row unit 12 includes a fertilizer opener assembly pivotally coupled to one of the top link or the bottom link via a pivot joint positioned forward of the body with respect to the direction of travel 22 (e.g., of the row unit 12). In certain embodiments, the fertilizer opener assembly includes a fertilizer opener shank pivotally coupled to the link, a fertilizer opener knife coupled to the fertilizer opener shank, and a fertilizer tube coupled to the fertilizer opener shank and/or the fertilizer opener knife. Furthermore, the row unit 12 includes a seed opener assembly coupled to the body. Accordingly, the seed opener assembly is positioned behind the fertilizer opener assembly with respect to the direction of travel 22. In certain embodiments, the seed opener assembly includes a seed opener knife coupled to the body, and a seed tube coupled to the seed opener knife. The fertilizer opener assembly (e.g., the fertilizer opener knife of the fertilizer opener assembly) is configured to form a fertilizer trench within the soil, and the fertilizer opener assembly (e.g., the fertilizer tube of the fertilizer opener assembly) is configured to deposit fertilizer within the fertilizer trench. Furthermore, the seed opener assembly (e.g., the seed opener knife of the seed opener assembly) is configured to form a seed trench within the soil, and the seed opener assembly (e.g., the seed tube of the seed opener assembly) is configured to deposit seeds within the seed trench.

In addition, the row unit 12 includes a packer wheel assembly movably (e.g., pivotally) coupled to the body. In certain embodiments, the packer wheel assembly includes a packer wheel configured to engage the soil surface. The packer wheel assembly is configured to pack soil on top of the deposited fertilizer and seeds, and the packer wheel assembly is configured to control a first penetration depth of the fertilizer opener assembly (e.g., the fertilizer opener knife of the fertilizer opener assembly) and a second penetration depth of the seed opener assembly (e.g., the seed opener knife of the seed opener assembly).

Furthermore, the row unit 12 includes a pivot control assembly configured to control rotation of the fertilizer opener assembly (e.g., the fertilizer opener shank of the fertilizer opener assembly) about the pivot joint. For example, in certain embodiments, the pivot control assembly includes a slot within the fertilizer opener assembly (e.g., the fertilizer opener shank of the fertilizer opener assembly) and a pin coupled to the other of the top link or the bottom link, in which the pin is engaged with the slot. Accordingly, rotation of the fertilizer opener assembly (e.g., the fertilizer opener shank of the fertilizer opener assembly) in a first direction is blocked by contact between the pin and a first stop at a first end of the slot, and rotation of the fertilizer opener assembly (e.g., the fertilizer opener shank of the fertilizer opener assembly) in a second direction, opposite the first direction, is blocked by contact between the pin and a second stop at a second end of the slot. During operation of the row unit 12, a downforce actuator may urge the fertilizer opener assembly to rotate, such that the pin engages the first stop. In response to contact between an obstacle (e.g., rock, etc.) and the fertilizer opener assembly (e.g., the fertilizer opener knife of the fertilizer opener assembly), the contact force may drive the fertilizer opener assembly to rotate about the pivot joint against the force applied by the downforce actuator (e.g., such that the pin engages the second stop). After the fertilizer opener assembly passes the obstacle, the downforce actuator may drive the fertilizer opener assembly to rotate in the first direction, such that the pin engages the first stop. Because the fertilizer opener assembly is configured to pivot about the pivot joint in response to contact with an obstacle, the penetration depth of the seed opener assembly (e.g., the seed opener knife of the seed opener assembly) may remain substantially constant while the fertilizer opener assembly contacts the obstacle, thereby enhancing the accuracy of seed deposition within the field, which may enhance yield of the resultant crops.

Because the seed opener assembly is coupled to the linkage assembly, the vertical movement of the seed opener assembly may be substantially equal to the vertical movement of the packer wheel assembly (e.g., as compared to a row unit in which the seed opener is coupled to a bar that is pivotally coupled to the toolbar). As the packer wheel assembly encounters variations in the soil surface, the packer wheel assembly may move vertically relative to the toolbar. For example, the packer wheel assembly may move 2 cm upwardly in response to engaging a ridge in the soil surface. Because the seed opener assembly is coupled to the linkage assembly, the seed opener assembly may also move about 2 cm upwardly. As a result, the accuracy of seed trench formation within uneven soil may be enhanced.

Furthermore, because the fertilizer opener assembly is pivotally coupled to one of the top link or the bottom link, the sensitivity of packing force to draft load is reduced (e.g., as compared to a row unit in which the fertilizer opener and the seed opener are coupled to a bar that is pivotally coupled to the toolbar, or a row unit having a single opener coupled to a rear link of a linkage assembly). For example, due to the downforce applied by the downforce actuator, the packer wheel of the packer wheel assembly may apply a packing force to the soil surface, thereby packing soil on top of the deposited seeds and fertilizer. In addition, engagement of the fertilizer opener assembly with the soil may induce a draft load on the work vehicle towing the agricultural seeding implement. Because the fertilizer opener assembly is positioned forward of the body (e.g., as compared to at the body), variations in the packing force due to variations in draft load may be reduced, thereby establishing a substantially consistent packing force throughout the field, which may enhance yield of the resultant crops.

Figure 2:
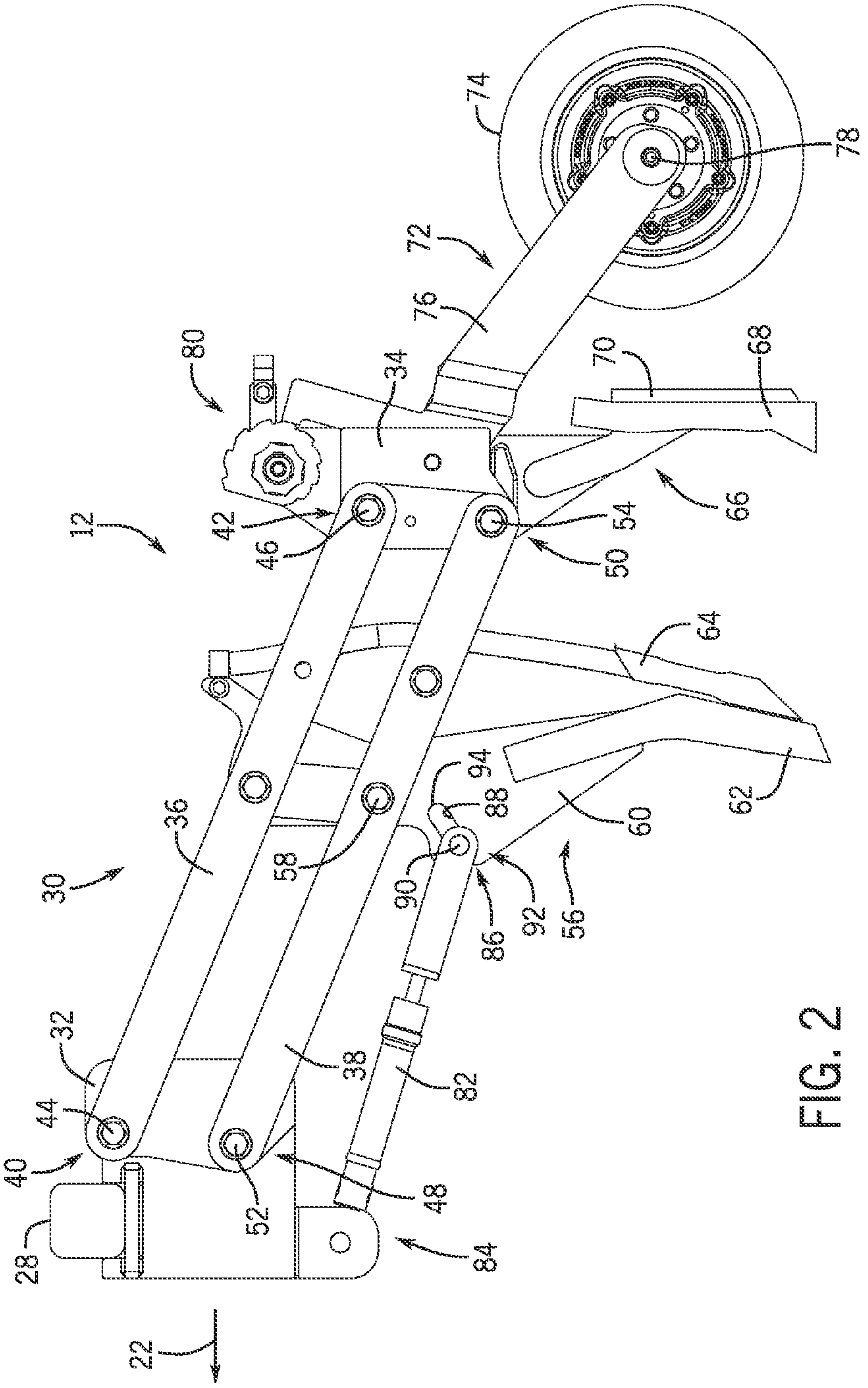
FIG. 2 is a side view of an embodiment of a row unit that may be employed within the agricultural seeding implement of FIG. 1.

FIG. 2 is a side view of an embodiment of a row unit 12 that may be employed within the agricultural seeding implement of FIG. 1. In the illustrated embodiment, the row unit 12 includes a linkage assembly 30 having a head bracket 32, a body 34, a top link 36, and a bottom link 38. The head bracket 32 is configured to couple the row unit 12 to the toolbar 28. For example, in certain embodiments, the head bracket 32 may be coupled to the toolbar 28 via one or more U-bolts. Furthermore, in certain embodiments, the head bracket 32 may be coupled to the toolbar 28 via a welded connection, an adhesive connection, a fastener connection, other suitable connection(s) (e.g., including the U-bolt connection), or a combination thereof. The head bracket 32 is substantially rigid and may be formed from any suitable component(s). For example, in certain embodiments, the head bracket 32 is formed as a single rigid element, such as from a single piece of material (e.g., via a casting process, via a machining process, via an additive manufacturing process, etc.). Furthermore, in certain embodiments, the head bracket may be formed from multiple components coupled to one another (e.g., via welded connection(s), via adhesive connection(s), via fastener connection(s), via other suitable type(s) of connection(s), or a combination thereof).

Furthermore, the top link 36 is pivotally coupled to the head bracket 32 and to the body 34. As illustrated, the top link 36 has a first end 40 and a second end 42. The first end 40 is pivotally coupled to the head bracket 32 via a pivot joint 44, and the second end 42 is pivotally coupled to the body 34 via a pivot joint 46. Each pivot joint may include any suitable component(s) to facilitate rotation of the top link 36 relative to the head bracket/body, such as bushing(s), bearing(s), axle(s), fastener(s), other suitable component(s), or a combination thereof. The top link 36 is substantially rigid and may be formed from any suitable component(s). For example, in certain embodiments, the top link is formed as a single rigid element, such as from a single piece of material (e.g., via a casting process, via a machining process, via an additive manufacturing process, etc.). Furthermore, in certain embodiments, the top link may be formed from multiple components coupled to one another (e.g., via welded connection(s), via adhesive connection(s), via fastener connection(s), via other suitable type(s) of connection(s), or a combination thereof).

In addition, the bottom link 38 is pivotally coupled to the head bracket 32 and to the body 34. As illustrated, the bottom link 38 has a first end 48 and a second end 50. The first end 48 is pivotally coupled to the head bracket 32 via a pivot joint 52, and the second end 50 is pivotally coupled to the body 34 via a pivot joint 54. Each pivot joint may include any suitable component(s) to facilitate rotation of the bottom link 38 relative to the head bracket/body, such as bushing(s), bearing(s), axle(s), fastener(s), other suitable component(s), or a combination thereof. The bottom link 38 is substantially rigid and may be formed from any suitable component(s). For example, in certain embodiments, the bottom link is formed as a single rigid element, such as from a single piece of material (e.g., via a casting process, via a machining process, via an additive manufacturing process, etc.). Furthermore, in certain embodiments, the bottom link may be formed from multiple components coupled to one another (e.g., via welded connection(s), via adhesive connection(s), via fastener connection(s), via other suitable type(s) of connection(s), or a combination thereof).

Furthermore, the body 34 is substantially rigid and may be formed from any suitable component(s). For example, in certain embodiments, the body is formed as a single rigid element, such as from a single piece of material (e.g., via a casting process, via a machining process, via an additive manufacturing process, etc.). Furthermore, in certain embodiments, the body may be formed from multiple components coupled to one another (e.g., via welded connection(s), via adhesive connection(s), via fastener connection(s), via other suitable type(s) of connection(s), or a combination thereof). As used herein with regard to the components of the linkage assembly, “substantially rigid” refers to a structure that establishes fixed locations of the pivot joints within the structure.

In the illustrated embodiment, the row unit 12 includes a fertilizer opener assembly 56 (e.g., first opener assembly) pivotally coupled to the bottom link 38 via a pivot joint 58 positioned forward of the body 34 with respect to the direction of travel 22 of the row unit 12. The pivot joint 58 may include any suitable component(s) to facilitate rotation of the fertilizer opener assembly 56 relative to the bottom link 38, such as bushing(s), bearing(s), axle(s), fastener(s), other suitable component(s), or a combination thereof. In the illustrated embodiment, the fertilizer opener assembly 56 includes a fertilizer opener shank 60 (e.g., first opener shank), a fertilizer opener knife 62 (e.g., fertilizer opener tool, first opener knife), and a fertilizer tube 64 (e.g., first tube). The fertilizer opener shank 60 is pivotally coupled to the bottom link 38 via the pivot joint 58. In addition, the fertilizer opener knife 62 is non-movably coupled (e.g., non-pivotally coupled and non-translatably coupled) to the fertilizer opener shank 60 via any suitable type(s) of connection(s), such as a fastener connection, a welded connection, a press-fit connection, an adhesive connection, other suitable type(s) of connection(s), or a combination thereof. Furthermore, in the illustrated embodiment, the fertilizer tube 64 is coupled to the fertilizer opener knife 62 and to the fertilizer opener shank 60. However, in other embodiments, the fertilizer tube may be coupled to the fertilizer opener knife alone or to the fertilizer opener shank alone. The fertilizer tube 64 may be coupled to the fertilizer opener shank 60 and/or the fertilizer opener knife 62 via any suitable type(s) of connection(s), such as fastener connection(s), adhesive connection(s), other suitable type(s) of connection(s), or a combination thereof. The fertilizer opener assembly 56 (e.g., the fertilizer opener knife 62 of the fertilizer opener assembly 56) is configured to form a fertilizer trench within the soil, and the fertilizer opener assembly 56 (e.g., the fertilizer tube 64 of the fertilizer opener assembly 56) is configured to deposit fertilizer within the fertilizer trench. As used herein with regard to the pivot joint 58 that pivotally couples the fertilizer opener assembly 56 to the bottom link 38, “positioned forward of the body” refers to a location forward of the pivot joint 54 that pivotally couples the bottom link 38 to the body 34 with respect to the direction of travel 22 of the row unit 12 (e.g., while the row unit 12 is in a working position for seed/fertilizer deposition into the soil).

While the fertilizer opener assembly 56 includes the fertilizer opener shank 60, the fertilizer opener knife 62, and the fertilizer tube 64 in the illustrated embodiment, in other embodiments, the fertilizer opener assembly may include other suitable component(s). For example, in certain embodiments, the fertilizer opener knife may be omitted, and the fertilizer opener shank may engage the soil and form the fertilizer trench. Furthermore, the fertilizer opener assembly may include another suitable fertilizer opener tool (e.g., alone or in combination with the fertilizer opener knife), such as a fertilizer opener disc. In certain embodiments, the fertilizer tube may be omitted, and the fertilizer opener knife may include a hollow passage configured to facilitate deposition of the fertilizer within the fertilizer trench.

Furthermore, the row unit 12 includes a seed opener assembly 66 (e.g., second opener assembly) coupled to the body 34. Accordingly, the seed opener assembly 66 is positioned behind the fertilizer opener assembly 56 with respect to the direction of travel 22. In the illustrated embodiment, the seed opener assembly 66 includes a seed opener knife 68 (e.g., seed opener tool, second opener knife) and a seed tube 70 (e.g., second tube). The seed opener knife 68 is non-movably coupled (e.g., non-pivotally coupled and non-translatably coupled) to the body 34 via any suitable type(s) of connection(s), such as a fastener connection, a welded connection, a press-fit connection, an adhesive connection, other suitable type(s) of connection(s), or a combination thereof. Furthermore, in the illustrated embodiment, the seed tube 70 is coupled to the seed opener knife 68 via any suitable type(s) of connection(s), such as a fastener connection, an adhesive connection, other suitable type(s) of connection(s), or a combination thereof. The seed opener assembly 66 (e.g., the seed opener knife 68 of the seed opener assembly 66) is configured to form a seed trench within the soil, and the seed opener assembly 66 (e.g., the seed tube 70 of the seed opener assembly 66) is configured to deposit seeds within the seed trench.

While the seed opener assembly 66 includes the seed opener knife 68 and the seed tube 70 in the illustrated embodiment, in other embodiments, the seed opener assembly may include other suitable component(s). For example, in certain embodiments, the seed opener assembly may include a seed opener shank coupled to the body and to the seed opener knife. Furthermore, the seed opener assembly may include another suitable seed opener tool (e.g., alone or in combination with the seed opener knife), such as a seed opener disc. In certain embodiments, the seed tube may be omitted, and the seed opener knife may include a hollow passage configured to facilitate deposition of the seeds within the seed trench.

In addition, the row unit 12 includes a packer wheel assembly 72 pivotally coupled to the body 34. In the illustrated embodiment, the packer wheel assembly 72 includes a packer wheel 74 configured to engage the soil surface. In addition, the packer wheel assembly 72 includes a packer wheel arm 76 pivotally coupled to the body 34, and the packer wheel 74 is rotatably coupled to the packer wheel arm 76 via a pivot joint 78. The pivot joint 78 may include any suitable component(s) to facilitate rotation of the packer wheel 74 relative to the packer wheel arm 76, such as bushing(s), bearing(s), axle(s), fastener(s), other suitable component(s), or a combination thereof. The packer wheel assembly 76 is configured to pack soil on top of the deposited fertilizer and seeds, and the packer wheel assembly 76 is configured to control a first penetration depth of the fertilizer opener assembly 56 (e.g., the fertilizer opener knife 62 of the fertilizer opener assembly 56) and a second penetration depth of the seed opener assembly 66 (e.g., the seed opener knife 68 of the seed opener assembly 66).

In the illustrated embodiment, the row unit 12 includes a depth adjustment assembly 80 configured to control an angle of the packer wheel arm 76 of the packer wheel assembly 72 relative to the body 34. Adjusting the angle of the packer wheel arm 76 relative to the body 34 adjusts a vertical position of the packer wheel 74 relative to the body 34, thereby varying the first penetration depth of the fertilizer opener assembly 56 (e.g., the fertilizer opener knife 62 of the fertilizer opener assembly 56) and the second penetration depth of the seed opener assembly 66 (e.g., the seed opener knife 68 of the seed opener assembly 66). The depth adjustment assembly 80 may include any suitable device(s)/system(s) configured to control the angle of the packer wheel arm 76 relative to the body 34. For example, the depth adjustment assembly may include a snail cam pivotally coupled to the body, and a follower coupled to the packer wheel arm. The target penetration depth may be established by rotating the snail cam to a desired angle relative to the body. Furthermore, the depth adjustment assembly may include multiple apertures and a pin configured to engage one of the apertures to establish the target penetration depth. In addition, the depth adjustment assembly may include a slot and a pin engaged with the slot. The pin may be secured at a position along the slot to establish the target penetration depth. While the packer wheel assembly 72 is configured to pivot relative to the body 34 in the illustrated embodiment, in other embodiments, the packer wheel assembly may be configured to translate vertically relative to the body. For example, in certain embodiments, the packer wheel assembly may be slidably coupled to the body. In such embodiments, the depth adjustment assembly may be configured to control the vertical position of the packer wheel assembly relative to the body.

Because the seed opener assembly 66 is coupled to the linkage assembly 30, the vertical movement of the seed opener assembly 66 may be substantially equal to the vertical movement of the packer wheel assembly 72 (e.g., as compared to a row unit in which the seed opener is coupled to a bar that is pivotally coupled to the toolbar). As the packer wheel assembly 72 encounters variations in the soil surface, the packer wheel assembly 72 may move vertically relative to the head bracket 32/toolbar 28. For example, the packer wheel assembly 72 may move 2 cm upwardly in response to engaging a ridge in the soil surface. Because the seed opener assembly 66 is coupled to the linkage assembly 30, the seed opener assembly 66 may also move about 2 cm upwardly. As a result, the accuracy of seed trench formation within uneven soil may be enhanced.

The length of each link and the positions of the pivot joints for the links may be particularly selected to control the movement of the body 34 relative to the head bracket 32/toolbar 28. For example, in certain embodiments, a length of the first link 36 may be equal to a length of the second link 38. In addition, a distance between the pivot joints at the head bracket 32 may be equal to a distance between the pivot joints at the body 34. As a result, the linkage assembly 30 may form a parallel linkage assembly/pantograph linkage assembly. The parallel linkage assembly may reduce the variation between the vertical movement of the packer wheel assembly 72 and the vertical movement of the fertilizer opener assembly 56 and the seed opener assembly 66 (e.g., as compared to a non-parallel linkage assembly). However, in certain embodiments, the first link may be longer than the second link, or the second link may be longer than the first link. Additionally or alternatively, the distance between the pivot joints at the head bracket may be greater than the distance between the pivot joints at the body, or the distance between the pivot joints at the head bracket may be less than the distance between the pivot joints at the body.

Furthermore, because the fertilizer opener assembly 56 is pivotally coupled to the bottom link 38, the sensitivity of packing force to draft load is reduced (e.g., as compared to a row unit in which the fertilizer opener and the seed opener are coupled to a bar that is pivotally coupled to the toolbar, or a row unit having a single opener coupled to a rear link of a linkage assembly). For example, the packer wheel 74 of the packer wheel assembly 72 may apply a packing force to the soil surface, thereby packing soil on top of the deposited seeds and fertilizer. In addition, engagement of the fertilizer opener assembly 56 with the soil may induce a draft load on the work vehicle towing the agricultural seeding implement. Because the fertilizer opener assembly 56 is positioned forward of the body (e.g., as compared to at the body), variations in the packing force due to variations in draft load may be reduced, thereby establishing a substantially consistent packing force throughout the field, which may enhance yield of the resultant crops.

In the illustrated embodiment, the pivot joint 58 that pivotally couples the fertilizer opener assembly 56 to the bottom link 38 is positioned a significant distance forward of the pivot joint 54 that pivotally couples the bottom link 38 to the body 34. Decreasing the distance between the pivot joint 52 that pivotally couples the bottom link 38 to the head bracket 32 and the pivot joint 58 may further reduce the packing force/draft load sensitivity. Accordingly, positioning the pivot joint 58 a significant distance forward of the pivot joint 54 that pivotally couples the bottom link 38 to the body 34 may further reduce the packing force/draft load sensitivity. While the pivot joint 58 that pivotally couples the fertilizer opener assembly 56 to the bottom link 38 is positioned closer to the pivot joint 54 that pivotally couples the bottom link 38 to the body 34 than the pivot joint 52 that pivotally couples the bottom link 38 to the head bracket 32 in the illustrated embodiment, in other embodiments, the pivot joint 58 may be equally spaced between the pivot joint that pivotally couples the bottom link to the body and the pivot joint that pivotally couples the bottom link to the head bracket, or the pivot joint 58 may be positioned closer to the pivot joint that pivotally couples the bottom link to the head bracket than the pivot joint that pivotally couples the bottom link to the body. Furthermore, in certain embodiments, the fertilizer opener assembly may be positioned at the body, and one pivot joint may pivotally couple the fertilizer opener assembly (e.g., the fertilizer opener shank of the fertilizer opener assembly) and the bottom link to the body.

In the illustrated embodiment, the row unit 12 includes a downforce actuator 82 configured to urge the fertilizer opener assembly 56 (e.g., the fertilizer opener knife 62 of the fertilizer opener assembly 56) and the seed opener assembly 66 (e.g., the seed opener knife 68 of the seed opener assembly 66) into the soil. The downforce actuator 82 may include any suitable type(s) of actuation device(s), such as hydraulic cylinder(s), pneumatic cylinder(s), spring(s), other suitable type(s) of actuation device(s), or a combination thereof. Furthermore, in certain embodiments, at least one actuation device of the downforce actuator 82 may be adjustable (e.g., by varying fluid pressure within hydraulic cylinder(s) and/or pneumatic cylinder(s), by adjusting adjustable spring(s), etc.). Additionally or alternatively, in certain embodiments, at least one actuation device of the downforce actuator 82 may not be adjustable.

In the illustrated embodiment, the downforce actuator 82 is pivotally coupled to the head bracket 32 and to the fertilizer opener assembly 56 (e.g., the fertilizer opener shank 60 of the fertilizer opener assembly 56). As illustrated, the downforce actuator 82 has a first end 84 and a second end 86. In the illustrated embodiment, the first end 84 is pivotally coupled to the head bracket 32, and the second end 86 is pivotally coupled to the fertilizer opener shank 60. Furthermore, in the illustrated embodiment, the downforce actuator 82 is configured to urge the fertilizer opener assembly 56 and the seed opener assembly 66 into the soil via retraction of the downforce actuator 82. Accordingly, the downforce actuator 82 is biased toward a retracted position to urge the fertilizer opener assembly 56 and the seed opener assembly 66 into the soil. For example, the downforce actuator 82 urges the fertilizer opener assembly 56 to pivot about the pivot joint 58, thereby urging the fertilizer opener knife 62 into the soil. In addition, the downforce actuator 82 urges the fertilizer opener assembly 56 to move downwardly, thereby urging the linkage assembly 30 to move the fertilizer opener assembly 56, the seed opener assembly 66, and the packer wheel assembly 72 to move downwardly, which urges the fertilizer opener knife 62 and the seed opener knife 68 into the soil, and drives the packer wheel 74 to apply a packing force to the soil surface.

While the downforce actuator 82 is pivotally coupled to the head bracket 32 and to the fertilizer opener shank 60 in the illustrated embodiment, in other embodiments, the downforce actuator may be coupled to other suitable component(s). For example, in certain embodiments, the first end of the downforce actuator may be pivotally coupled to the toolbar. Additionally or alternatively, in certain embodiments, the second end of the downforce actuator may be pivotally coupled to the top link, to the bottom link, to the fertilizer opener knife, to the seed opener knife, or to the body. Furthermore, while the downforce actuator 82 is configured to urge the fertilizer opener assembly 56 and the seed opener assembly 66 into the soil via retraction of the downforce actuator 82 in the illustrated embodiment, in other embodiments (e.g., in embodiments in which the downforce actuator is positioned above the linkage assembly), the downforce actuator may be configured to urge the fertilizer opener assembly and the seed opener assembly into the soil via extension of the downforce actuator. In such embodiments, the downforce actuator may be biased toward an extended position to urge the fertilizer opener assembly and the seed opener assembly into the soil.

In certain embodiments, the downforce actuator 82 includes at least one hydraulic or pneumatic cylinder configured to urge the fertilizer opener assembly 56 and the seed opener assembly 66 into the soil during operation of the row unit 12, and to raise the fertilizer opener assembly 56 and the seed opener assembly 66 above the soil surface during transport of the row unit 12. For example, during operation of the row unit 12 (e.g., during the seeding operation), a fluid control system may control the downforce actuator 82, such that the downforce actuator 82 is biased to retract, thereby urging the fertilizer opener assembly 56 and the seed opener assembly 66 into the soil. In addition, during transport of the row unit 12 (e.g., at a headland turn, during transport across a field, during transport along a road, etc.), the fluid control system may control the downforce actuator 82, such that the downforce actuator 82 extends, thereby lifting the fertilizer opener assembly 56 (e.g., the fertilizer opener knife 62 of the fertilizer opener assembly 56) and the seed opener assembly 66 (e.g., the seed opener knife 68 of the seed opener assembly 66) above the soil surface. Furthermore, in embodiments in which the downforce actuator is configured to urge the fertilizer opener assembly and the seed opener assembly into the soil via extension of the downforce actuator, during operation of the row unit (e.g., during the seeding operation), the fluid control system may control the downforce actuator, such that the downforce actuator is biased to extend, thereby urging the fertilizer opener assembly and the seed opener assembly into the soil. In addition, during transport of the row unit (e.g., at a headland turn, during transport across a field, during transport along a road, etc.), the fluid control system may control the downforce actuator, such that the downforce actuator retracts, thereby lifting the fertilizer opener assembly (e.g., the fertilizer opener knife of the fertilizer opener assembly) and the seed opener assembly (e.g., the seed opener knife of the seed opener assembly) above the soil surface. While a downforce actuator configured to raise the fertilizer opener assembly and the seed opener assembly above the soil surface during transport of the row unit is disclosed above, in certain embodiments, the downforce actuator may only be configured to urge the fertilizer opener assembly and the seed opener assembly into the soil. In such embodiments, the fertilizer opener assembly and the seed opener assembly may be raised above the soil surface via upward movement of the toolbar.

In the illustrated embodiment, the fertilizer opener assembly 56 (e.g., the fertilizer opener shank 60 of the fertilizer opener assembly 56) has a slot 88 (e.g., downforce slot), and the downforce actuator 82 includes a pin 90 (e.g., downforce pin) positioned at the second end 86 of the downforce actuator 82. As illustrated, the pin 90 is engaged with the slot 88. A first stop 92 is positioned at a first end of the slot 88, and a second stop 94 is positioned at a second end of the slot 88, opposite the first end. During operation of the row unit 12, the downforce actuator 82 is biased toward the retracted position, thereby urging the pin 90 against the first stop 92, which urges the fertilizer opener assembly 56 and the seed opener assembly 66 into the soil. Furthermore, to transition the row unit 12 into a transport configuration for transporting the row unit 12, the downforce actuator 82 is controlled to extend, thereby driving the pin 90 into engagement with the second stop 94. As the downforce actuator 82 continues to extend, the fertilizer opener assembly 56 is driven upwardly, such that the fertilizer opener knife 62 disengages the soil. As the fertilizer opener assembly 56 is driven upwardly, the linkage assembly 30 drives the seed opener assembly 66 and the packer wheel assembly 72 upwardly, such that the seed opener knife 68 disengages the soil and the packer wheel 74 disengages the soil surface. The slot 88 enables the pin 90 to be positioned at a suitable location on the fertilizer opener assembly 56 to facilitate transitioning the row unit 12 to the transport configuration, and in a suitable location on the fertilizer opener assembly 56 to facilitate urging the fertilizer opener assembly 56 and the seed opener assembly 66 into the soil.

While the slot is formed within the fertilizer opener shank 60 in the illustrated embodiment, in embodiments in which the second end of the downforce actuator is coupled to another component of the row unit, the slot may be formed in the component. Furthermore, in certain embodiments, the pin may be coupled to the component (e.g., the fertilizer opener shank, etc.), and the slot may be formed in the second end of the downforce actuator. In addition, in embodiments in which the downforce actuator is configured to transition the row unit to the transport configuration via retraction, the component of the row unit coupled to the second end of the downforce actuator or the second end of the downforce actuator may have a slot. Furthermore, while the slot is present in the illustrated embodiment, in other embodiments, the slot may be omitted (e.g., the second end of the downforce actuator may be coupled to the fertilizer opener shank via a fixed pivot joint).

Furthermore, as discussed in detail below, the row unit 12 includes a pivot control assembly configured to control rotation of the fertilizer opener assembly 56 (e.g., the fertilizer opener shank 60 of the fertilizer opener assembly 56) about the respective pivot joint 58. For example, in certain embodiments, the pivot control assembly includes a slot within the fertilizer opener assembly 56 (e.g., the fertilizer opener shank 60 of the fertilizer opener assembly 56) and a pin coupled to the top link 36, in which the pin is engaged with the slot. Accordingly, rotation of the fertilizer opener assembly 56 (e.g., the fertilizer opener shank 60 of the fertilizer opener assembly 56) in a first direction is blocked by contact between the pin and a first stop at a first end of the slot, and rotation of the fertilizer opener assembly 56 (e.g., the fertilizer opener shank 60 of the fertilizer opener assembly 56) in a second direction, opposite the first direction, is blocked by contact between the pin and a second stop at a second end of the slot. During operation of the row unit 12, the downforce actuator 82 urges the fertilizer opener assembly 56 to rotate, such that the pin engages the first stop (e.g., to establish a generally vertical orientation of the fertilizer opener knife). In response to contact between an obstacle (e.g., rock, etc.) and the fertilizer opener assembly 56 (e.g., the fertilizer opener knife 62 of the fertilizer opener assembly 56), the contact force may drive the fertilizer opener assembly 56 to rotate about the pivot joint 58 against the force applied by the downforce actuator 82 (e.g., such that the pin engages the second stop). After the fertilizer opener assembly 56 passes the obstacle, the downforce actuator 82 may drive the fertilizer opener assembly 56 to rotate in the first direction, such that the pin engages the first stop. Because the fertilizer opener assembly 56 is configured to pivot about the pivot joint 58 in response to contact with an obstacle, the penetration depth of the seed opener assembly 66 (e.g., the seed opener knife 68 of the seed opener assembly 66) may remain substantially constant while the fertilizer opener assembly 56 contacts the obstacle, thereby enhancing the accuracy of seed deposition within the field, which may enhance yield of the resultant crops.

While the fertilizer opener assembly 56 (e.g., the fertilizer opener shank 60 of the fertilizer opener assembly 56) is pivotally coupled to the bottom link 38 in the illustrated embodiment, in other embodiments, the fertilizer opener assembly (e.g., the fertilizer opener shank of the fertilizer opener assembly) may be pivotally coupled to the top link via the pivot joint positioned forward of the body with respect to the direction of travel of the row unit. In such embodiments, in response to rotation of the fertilizer opener assembly about the pivot joint, the angle of the fertilizer opener knife relative to the soil surface may vary less than the angle of the fertilizer opener knife in embodiments in which the fertilizer opener assembly is pivotally coupled to the bottom link. As used herein with regard to the pivot joint that pivotally couples the fertilizer opener assembly to the top link, "positioned forward of the body" refers to a location forward of the pivot joint that pivotally couples the top link to the body with respect to the direction of travel of the row unit (e.g., while the row unit is in a working position for seed/fertilizer deposition into the soil). Furthermore, in certain embodiments, the fertilizer opener assembly may be positioned at the body, and one pivot joint may pivotally couple the fertilizer opener assembly (e.g., the fertilizer opener shank of the fertilizer opener assembly) and the top link to the body.

In addition, while the fertilizer opener knife 62 is non-movably coupled to the fertilizer opener shank 60 in the illustrated embodiment, in other embodiments, the fertilizer opener knife may be pivotally or translatably coupled to the fertilizer opener shank. In such embodiments, the row unit may include another depth adjustment assembly configured to control a vertical position of the fertilizer opener knife relative to the fertilizer opener shank. Accordingly, the first penetration depth of the fertilizer opener knife may be adjusted. Furthermore, while the seed opener assembly 66 (e.g., the seed opener knife 68 of the seed opener assembly 66) is non-movably coupled to the body 34 in the illustrated embodiment, in other embodiments, the seed opener assembly (e.g., the seed opener knife of the seed opener assembly) may be pivotally or translatably coupled to the body. In such embodiments, the row unit may include another depth adjustment assembly configured to control a vertical position of the seed opener knife relative to the body. Accordingly, the second penetration depth of the seed opener assembly (e.g., the seed opener knife of the seed opener assembly) may be adjusted. In embodiments in which the vertical position(s) of the fertilizer opener knife and/or the seed opener knife/assembly is/are adjustable, the packer wheel assembly may be non-movably coupled to the body. In addition, in the illustrated embodiment, the front opener assembly (e.g., first opener assembly) is configured to deposit fertilizer into the soil, and the rear opener assembly (e.g., second opener assembly) is configured to deposit seeds into the soil. However, in other embodiments, at least one opener assembly may be configured to deposit another suitable agricultural product into the soil. For example, in certain embodiments, the front opener assembly (e.g., first opener assembly) may be configured to deposit seeds into the soil, and the rear opener assembly (e.g., second opener assembly) may be configured to deposit fertilizer into the soil.

Figure 3:
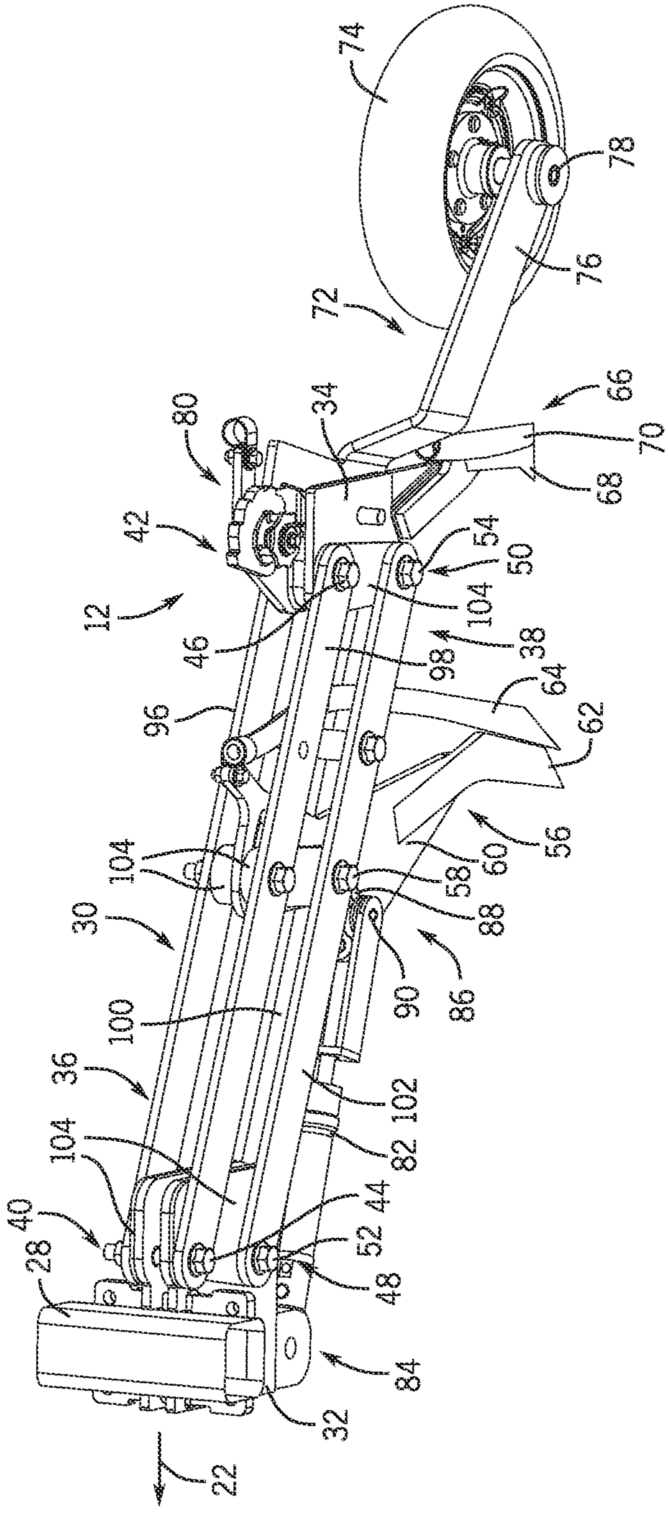
FIG. 3 is a perspective view of the row unit of FIG. 2.

FIG. 3 is a perspective view of the row unit 12 of FIG. 2. In the illustrated embodiment, each link includes multiple link members. As illustrated, the top link 36 includes a first link member 96 and a second link member 98 positioned on opposite lateral sides of the head bracket 32, the fertilizer opener shank 60, and the body 34. In addition, the bottom link 38 includes a first link member 100 and a second link member 102 positioned on opposite lateral sides of the head bracket 32, the fertilizer opener shank 60, and the body 34. While each link includes two link members in the illustrated embodiment, in other embodiments, at least one link may include more or fewer link members (e.g., 1, 3, 4, or more).

Furthermore, in the illustrated embodiment, the row unit 12 includes multiple bushings 104. As illustrated, a bushing 104 is laterally disposed between the first link members and the head bracket 32, a bushing 104 is laterally disposed between the second link members and the head bracket 32, a bushing 104 is laterally disposed between the first link members and the fertilizer opener shank 60, a bushing 104 is laterally disposed between the second link members and the fertilizer opener shank 60, a bushing is laterally disposed between the first link members and the body 34, and a bushing 104 is laterally disposed between the second link members and the body 34. The bushings 104 are configured to establish a desired spacing between components and to facilitate pivotal movement between components. While the row unit 12 includes six bushings 104 in the illustrated embodiment, in other embodiments, the row unit may include more or fewer bushings (e.g., 0, 1, 2, 3, 4, 5, 7, 8, or more). For example, in certain embodiments, the bushings may be omitted.

Figure 4:
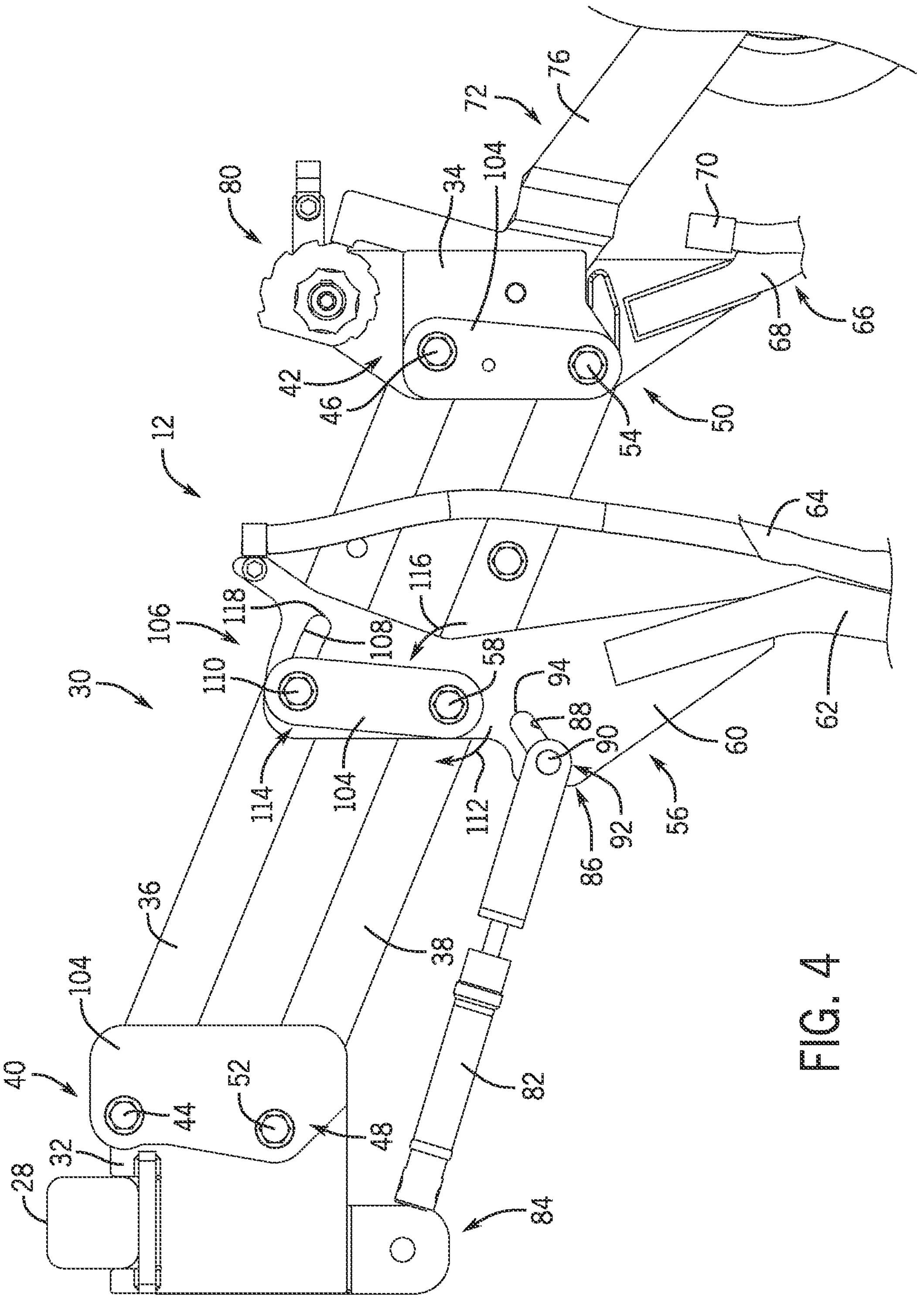
FIG. 4 is a detailed side view of a portion of the row unit of FIG. 2.

FIG. 4 is a detailed side view of a portion of the row unit 12 of FIG. 2. The row unit 12 includes a pivot control assembly 106 configured to control rotation of the fertilizer opener assembly 56 about the pivot joint 58. In the illustrated embodiment, the pivot control assembly 106 includes a slot 108 (e.g., pivot control slot) within the fertilizer opener shank 60 of the fertilizer opener assembly 56. In addition, the pivot control assembly 106 includes a pin 110 (e.g., pivot control pin) coupled to the top link 36, in which the pin 110 is engaged with the slot 108. Accordingly, rotation of the fertilizer opener shank 60 of the fertilizer opener assembly 56 in a first direction 112 is blocked by contact between the pin 110 and a first stop 114 at a first end of the slot 108, and rotation of the fertilizer opener shank 60 of the fertilizer opener assembly 56 in a second direction 116, opposite the first direction 112, is blocked by contact between the pin 110 and a second stop 118 at a second end of the slot 108. During operation of the row unit 12, the downforce actuator 82 urges the fertilizer opener assembly 56 to rotate in the first direction 112, such that the pin 110 engages the first stop 114 (e.g., to establish a generally vertical orientation of the fertilizer opener knife). In response to contact between an obstacle (e.g., rock, etc.) and the fertilizer opener knife of the fertilizer opener assembly 56, the contact force may drive the fertilizer opener assembly 56 to rotate about the pivot joint 58 in the second direction 116 against the force applied by the downforce actuator 82 (e.g., such that the pin 110 engages the second stop 118). After the fertilizer opener assembly 56 passes the obstacle, the downforce actuator 82 may drive the fertilizer opener assembly 56 to rotate in the first direction 112, such that the pin 110 engages the first stop 114. Because the fertilizer opener assembly 56 is configured to pivot about the pivot joint 58 in response to contact with an obstacle, the penetration depth of the seed opener knife 68 of the seed opener assembly 66 may remain substantially constant while the fertilizer opener assembly 56 contacts the obstacle, thereby enhancing the accuracy of seed deposition within the field, which may enhance yield of the resultant crops.

Furthermore, to transition the row unit 12 into the transport configuration, the downforce actuator 82 is controlled to extend, thereby driving the pin 90 into engagement with the second stop 94. As the downforce actuator 82 continues to extend, the downforce actuator 82 drives the fertilizer opener assembly 56 to rotate about the pivot joint 58 in the second direction 116 until the pin 110 engages the second stop 118. Further extension of the downforce actuator 82 drives the fertilizer opener assembly 56 upwardly, such that the fertilizer opener knife 62 disengages the soil. As the fertilizer opener assembly 56 is driven upwardly, the linkage assembly 30 drives the seed opener assembly 66 and the packer wheel assembly 72 upwardly, such that the seed opener knife 68 disengages the soil and the packer wheel 74 disengages the soil surface.

As previously discussed, in certain embodiments, the fertilizer opener shank may be pivotally coupled to the top link via the pivot joint. In such embodiments, the pin may be coupled to the bottom link, and the slot may be positioned to receive the pin. Furthermore, in certain embodiments, the pin may be coupled to the fertilizer opener shank, and the slot may be formed in a respective link. In addition, in certain embodiments, the pivot control assembly may include other suitable device(s)/system(s) to control rotation of the fertilizer opener assembly about the pivot joint (e.g., instead of the pin and slot configuration disclosed above). For example, in certain embodiments, the pivot control assembly may include a chain or cable coupled to the fertilizer opener assembly and to the seed opener assembly. In such embodiments, the chain/cable may block rotation of the fertilizer opener assembly in the first direction (e.g., while the downforce actuator is urging the fertilizer opener assembly to rotate in the first direction). In addition, in certain embodiments, the pivot control assembly may include one or more stops coupled to the linkage assembly. For example, in embodiments in which the fertilizer opener assembly is pivotally coupled to the bottom link, one or more stops may be coupled to the bottom link to control rotation of the fertilizer opener assembly about the pivot joint. Furthermore, in certain embodiments, the pivot control assembly may include a pivot control linkage coupled to the fertilizer opener assembly and to the linkage assembly, in which the pivot control linkage is configured to control rotation of the fertilizer opener assembly about the pivot joint.

In addition, in certain embodiments, the seed opener assembly may be pivotally coupled to the body via a pivot joint. In such embodiments, the row unit may include a second downforce actuator configured to urge the seed opener assembly into the soil. In addition, the row unit may include a second pivot control assembly configured to control rotation of the seed opener assembly about the pivot joint. The pivot control assembly may include any of the device(s)/system(s) disclosed above with regard to the fertilizer opener assembly, such as the pin/slot configuration, the chain/cable configuration, or the stop(s) configuration.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit for an agricultural seeding implement, comprising:
- a linkage assembly, comprising:
  - a head bracket configured to couple the row unit to a toolbar;
  - a body;
  - a top link directly pivotally coupled to the head bracket and to the body; and
  - a bottom link directly pivotally coupled to the head bracket and to the body;
- a first opener assembly directly pivotally coupled to one of the top link or the bottom link via a pivot joint positioned forward of the body with respect to a direction of travel of the row unit;
- a pivot control assembly configured to control rotation of the first opener assembly about the pivot joint;
- a second opener assembly coupled to the body; and
- a packer wheel assembly movably coupled to the body, wherein the packer wheel assembly is configured to control a first penetration depth of the first opener assembly and a second penetration depth of the second opener assembly.

2. The row unit of claim 1, comprising a downforce actuator configured to urge the first opener assembly and the second opener assembly into soil.

3. The row unit of claim 2, wherein the downforce actuator is pivotally coupled to the head bracket and to the first opener assembly.

4. The row unit of claim 3, wherein the first opener assembly has a slot, the downforce actuator comprises a pin, and the pin is engaged with the slot.

5. The row unit of claim 1, wherein the second opener assembly is non-pivotally coupled to the body.

6. The row unit of claim 1, comprising a depth adjustment assembly, wherein the packer wheel assembly is pivotally coupled to the body, and the depth adjustment assembly is configured to control an angle of the packer wheel assembly relative to the body.

7. The row unit of claim 1, wherein the pivot control assembly comprises a first stop configured to block rotation of the first opener assembly in a first direction and a second stop configured to block rotation of the first opener assembly in a second direction, opposite the first direction.

8. The row unit of claim 7, wherein the pivot control assembly comprises a slot within the first opener assembly and a pin coupled to the other of the top link or the bottom link, the first stop is positioned at a first end of the slot, the second stop is positioned at a second end of the slot, and the pin is engaged with the slot.

9. The row unit of claim 1, wherein the first opener assembly is pivotally coupled to the bottom link via the pivot joint.

10. A row unit for an agricultural seeding implement, comprising:
- a linkage assembly, comprising:
  - a head bracket configured to couple the row unit to a toolbar;
  - a body;
  - a top link pivotally coupled to the head bracket and to the body; and
  - a bottom link pivotally coupled to the head bracket and to the body;
- a first opener shank pivotally coupled to one of the top link or the bottom link via a pivot joint positioned forward of the body with respect to a direction of travel of the row unit;
- a first opener knife coupled to the first opener shank;
- a first tube coupled to the first opener knife, the first opener shank, or a combination thereof;
- a pivot control assembly configured to control rotation of the first opener shank about the pivot joint, wherein the pivot control assembly comprises a slot within the first opener shank and a pin coupled to the other of the top link or the bottom link, and the pin is engaged with the slot;
- a second opener knife coupled to the body;
- a second tube coupled to the second opener knife; and
- a packer wheel assembly movably coupled to the body, wherein the packer wheel assembly is configured to control a first penetration depth of the first opener knife and a second penetration depth of the second opener knife.

11. The row unit of claim 10, comprising a downforce actuator configured to urge the first opener knife and the second opener knife into soil.

12. The row unit of claim 11, wherein the downforce actuator is pivotally coupled to the head bracket and to the first opener shank.

13. The row unit of claim 12, wherein the first opener shank has an additional slot, the downforce actuator comprises an additional pin, and the additional pin is engaged with the additional slot.

14. The row unit of claim 10, wherein the second opener knife is non-pivotally coupled to the body.

15. The row unit of claim 10, comprising a depth adjustment assembly, wherein the packer wheel assembly is pivotally coupled to the body, and the depth adjustment assembly is configured to control an angle of the packer wheel assembly relative to the body.

16. The row unit of claim 10, wherein the top link comprises a plurality of link members, the bottom link comprises a plurality of link members, or a combination thereof.

17. A row unit for an agricultural seeding implement, comprising:
- a linkage assembly, comprising:
  - a head bracket configured to couple the row unit to a toolbar;
  - a body;
  - a top link pivotally coupled to the head bracket and to the body; and
  - a bottom link pivotally coupled to the head bracket and to the body;
- a first opener assembly pivotally coupled to one of the top link or the bottom link via a pivot joint, wherein the first opener assembly has a slot;

a second opener assembly coupled to the body;

a packer wheel assembly movably coupled to the body, wherein the packer wheel assembly is configured to control a first penetration depth of the first opener assembly and a second penetration depth of the second opener assembly; and a downforce actuator configured to urge the first opener assembly and the second opener assembly into soil, wherein the downforce actuator is pivotally coupled to the head bracket and to the first opener assembly, the downforce actuator comprises a pin, and the pin is engaged with the slot.

18. The row unit of claim 17, wherein the pivot joint is positioned forward of the body with respect to a direction of travel of the row unit.

19. The row unit of claim 17, comprising a depth adjustment assembly, wherein the packer wheel assembly is pivotally coupled to the body, and the depth adjustment assembly is configured to control an angle of the packer wheel assembly relative to the body.

20. The row unit of claim 17, wherein the first opener assembly is pivotally coupled to the bottom link via the pivot joint.

* * * * *